United States Patent [19]

Mitchell et al.

[11] 4,415,905
[45] Nov. 15, 1983

[54] ELECTROLYTIC PRINTING PROCESS WITH WEAR RESISTANT ELECTRODE

[75] Inventors: Joseph W. Mitchell, Montrose; Merrill W. Shafer, Yorktown Heights; Carlos J. Sambucetti, Croton-on-Hudson, all of N.Y.

[73] Assignee: International Business Machines Corporation, Armonk, N.Y.

[21] Appl. No.: 465,236

[22] Filed: Feb. 10, 1983

Related U.S. Application Data

[63] Continuation of Ser. No. 164,388, Jun. 30, 1980.

[51] Int. Cl.³ .................. C25B 11/10; C25B 11/08
[52] U.S. Cl. ........................ 346/1.1; 204/290 F;
 204/2; 204/290 R; 346/139 C
[58] Field of Search ............... 204/290 R, 290 F;
 346/1.1, 139 C

[56] References Cited

U.S. PATENT DOCUMENTS

| | | | |
|---|---|---|---|
| 3,761,954 | 9/1973 | Hansen et al. | 346/139 C |
| 3,773,555 | 11/1973 | Cotton et al. | 427/123 |
| 4,005,003 | 1/1977 | Popplewell et al. | 204/290 F |
| 4,042,936 | 8/1977 | Yoshikawa | 346/1.1 |
| 4,100,050 | 7/1978 | Cook et al. | 204/252 |
| 4,353,790 | 10/1982 | Kanai et al. | 204/290 F |

*Primary Examiner*—F. Edmundson
*Attorney, Agent, or Firm*—Joseph G. Walsh

[57] ABSTRACT

The present invention provides a process for electrolytic printing using an improved electrode. The electrode has a region which is an oxide of a metal from the group of ruthenium, iridium, platinum or an alloy thereof. The oxide region is at the extremity of the electrode which during the printing is in close proximity to the printing medium. This oxide region provides an increase in wear resistance of about two orders of magnitude over non-oxidized electrodes. Method for fabricating the described electrode is also set forth.

7 Claims, 2 Drawing Figures

ELECTROLYTIC PRINTING PROCESS WITH WEAR RESISTANT ELECTRODE

The present application is a continuation of copending application Ser. No. 164,388, filed June 30, 1980.

TECHNICAL FIELD

This invention relates to an electrolytic printing process with an electrode that is wear resistant.

BACKGROUND ART

Electrolytic printers are currently available which employ non-consumable electrodes. A non-consumable electrode is defined as one which does not participate in the chemical reaction which produces the resulting image. While these non-consumable electrodes do not participate in the reaction, they have been found to be subject to substantial wear.

U.S. Pat. No. 3,761,954 suggests that wear might be the result of corrosion due to arcing and other atmospheric conditions at the tip of the electrode. U.S. Pat. No. 3,761,954 goes on to suggest that iridium has been found to be an acceptable material for printing electrodes since it is a good conductor and also highly resistant to the corrosion that occurs at the tip of the electrode when it is in actual use.

U.S. Pat. No. 4,042,936 suggests the use of electrodes made from tungsten, iridium, silver, stainless steel or the like. U.S. Pat. No. 4,042,936 points out that one of the problems associated with electrolytic printing is wear of the electrodes and suggests that the problem may be overcome by employing a special printing medium.

While the noble metal oxides have been employed for electrode materials for the electrolysis of aqueous solutions containing alkaline metal halides, these solutions are not analogous to the solutions employed in electrolytic printing.

U.S. Pat. No. 4,100,050 suggests that for a highly alkaline liquor employed in electrolysis, the rate of consumption of noble metal electrodes is greater than that of the noble metal oxide electrodes. U.S. Pat. No. 4,100,050 goes on to report that the consumption rate is reduced by about an order of magnitude when a ruthenium electrode is replaced with a ruthenium oxide ($RuO_2$) electrode. It should be pointed out that the liquors or solutions used for electrolysis are substantially more corrosive than those employed in printing operations.

The analogous electrolytic art which teaches the use of non-consumable electrodes for electrolytic printing does not indicate that the wear rate of the electrode is to a large extent controlled by the dissolution rate of the electrodes. Therefore, employing noble metal oxides for electrodes for electrolytic printers would not be an obvious way to alleviate the wear problem.

DISCLOSURE OF THE INVENTION

It is an object of the invention to provide a wear resistant electrode for electrolytic printing.

It is another object of the invention to provide a coating for a metallic electrode which will enhance the wear resistance of the resulting electrode.

These and other objects and advantages of the invention will become apparent from the following description, accompanying drawings, and appended claims in which various novel features of the invention are more particularly set forth.

The present invention is a printing process using an electrode which has a region which is an oxide of a metal from the group of ruthenium, iridium, platinum or an alloy thereof. The oxide region is at the extremity of the electrode and during printing this region is in close proximity to the printing medium.

BEST MODES FOR CARRYING OUT THE INVENTION

Figure 1:
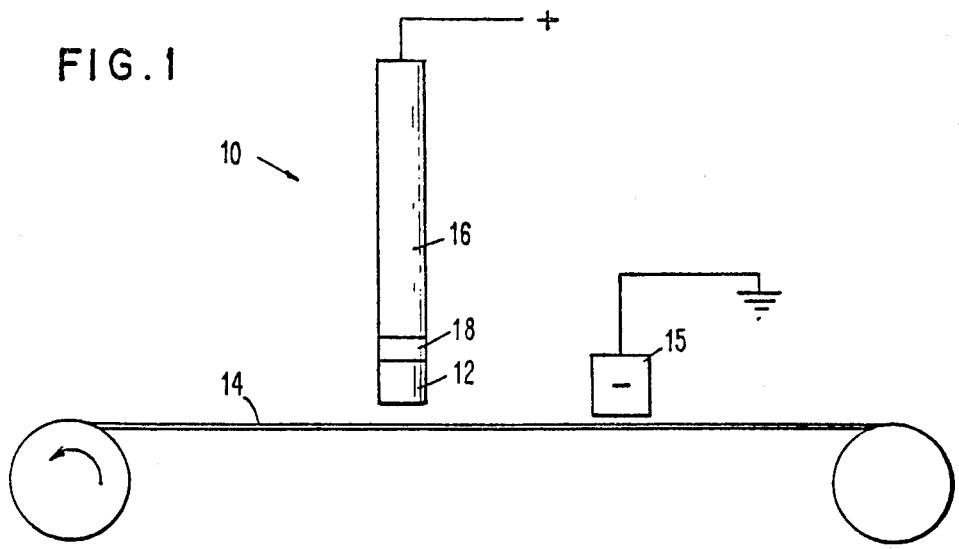
FIG. 1 is a schematic representation of an electrode useful in the present invention.

FIG. 1 is an illustration of one embodiment of an electrode useful in the present invention. An electrode 10 has a region 12 which is an oxide of a metal from the group of ruthenium, iridium, platinum, or an alloy thereof. The oxide region 12 is at the extremity of the electrode 10. This extremity during printing is the portion of the electrode which is held in closest proximity to the printing medium 14. During printing the electrode 10 is maintained at a potential which is higher than the potential of a bus electrode 15 which is maintained in contact with the printing medium 14.

When the oxide region 12 is attached to a metal substrate 16, it is preferable to employ an intermediate layer 18 of titanium oxide ($TiO_2$) to insure adhesion between the oxide region 12 and the substrate 16. It is found that the use of ruthenium oxide ($RuO_2$) provides a very wear resistant coating when applied to a substrate 16. It has been found that the optimum thickness for the $RuO_2$ region is between about 5,000 A and 50,000 A.

Likewise, it has been found that titanium oxide ($TiO_2$) provides a very effective bonding medium for the ruthenium oxide layer 12. Again, it has been found that the thickness for the titanium oxide layer will be most effective when it is from about 200 A to about 10,000 A in thickness.

A layer of about 200 A of $TiO_2$ is of sufficient thickness to provide a good crystallographic substrate for the subsequent deposition of the $RuO_2$. The reason for employing the $TiO_2$ layer is that $TiO_2$ and $RuO_2$ have compatible crystal structures (Rutile structures). A minimum thick layer of about 200 A for the $TiO_2$ layer is necessary to provide sufficient crystallographic planes of the $TiO_2$ structure to superimpose the isomorph $RuO_2$ crystal. $TiO_2$ layer of up to 10,000 A have been found to work well when the underlying metal support is titanium or steel. The resistance of the metal electrode 10 is not increased significantly when the $TiO_2$ layer is maintained below about 10,000 A in thickness.

A ruthenium oxide layer of 5,000 A is thick enough to provide good quality printing. A $RuO_2$ layer less than 5,000 A is not advisable because defects such as pinholes, adhesion failures, etc., may occur in the $RuO_2$ layer. With $RuO_2$ layer thickness of about 50,000 A the electrode will print billions of characters.

While the electrode 10 shown in FIG. 1 is a composite structure, it is possible to make an electrode which is composed of only $RuO_2$.

Figure 2:
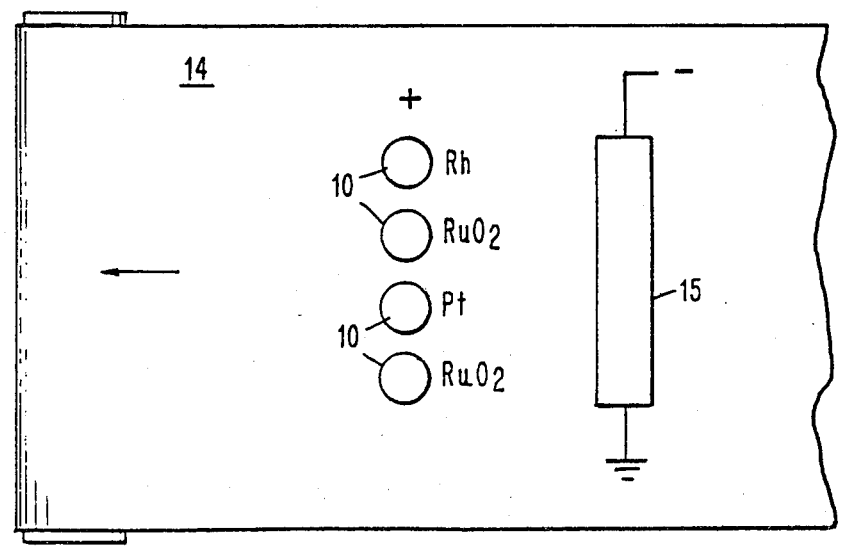
FIG. 2 is a schematic representation of an electrode test configuration employed for comparative wear studies.

Comparative studies on different electrode materials were done with a series of cylindrical electrodes. These electrodes were prepared and maintained in close proximity to a bus electrode 15 as shown in FIG. 2. The electrodes 10 were maintained at a positive potential with respect to the bus electrode 15. This potential produces a current between the electrodes 10 and bus electrode 15 which is carried by the printing medium 14. Four electrodes (a rhodium, a ruthenium oxide, a platinum and another ruthenium oxide) were placed in close proximity to a bus electrode as illustrated in FIG. 2. After the electrodes had been used for many print cycles, the bus bar was examined. It was found that opposite the ruthenium oxide electrodes there were no deposits on the surface of the bus bar 15 whereas opposite the electrodes that were metallic, (the rhodium and the platinum electrodes), deposits of rhodium and platinum respectively were found. This study indicates that a substantial portion of the wear results from metal transport from the metal electrodes 10 to the bus electrode 15. In analogous studies on Ru metal electrodes transport of Ru was observed.

In order to further characterize the improvement resulting from the use of ruthenium oxide, a series of cylindrical electrodes 0.05 cm (20 mil) in diameter were prepared and tested for $10^5$ printing cycles. The results of these tests are summarized in TABLE I.

TABLE I

| Material | Wear characteristic under printing conditions | |
|---|---|---|
| | No. of Print cycles | Wear Microns |
| Pt | 100,000 | 20μ |
| Ru | 100,000 | 26μ |
| Rh | 100,000 | 16μ |
| TiO$_2$/RuO$_2$ | 100,000 | 0.1μ |

As can be seen from examination of the test data employing ruthenium oxide resulted in an increase of about two orders of magnitude in the wear resistance over either the platinum, rhodium or the ruthenium electrodes. The Ru electrode was fabricated by plating Ru onto a Pt cylinder. The increase in the wear rate over the other metal electrodes can be explained by the fact that the deposited metals generally have reduced wear resistance. It should furthermore be pointed out that the inherent weakness of the deposited Ru does not occur when deposited Ru is subsequently oxidized. The resulting increase in wear of about two orders of magnitude is an order of magnitude greater than that noted in the U.S. Pat. No. 4,100,050.

The electrodes 10 had a 0.05 cm (20 mil) diameter. For the TiO$_2$/RuO$_2$ electrode a layer of 7,000 A TiO$_2$ was evaporated onto a Ti cross section and another layer of 30,000 A RuO$_2$ was deposited onto the TiO$_2$. A gold bus electrode 15, 0.25 cm long, 0.05 cm wide was set alongside the electrodes 10 at a distance from them of 0.01 cm. A voltage of 50 volt was applied to the electrodes 10 (+ polarity). Paper saturated with an electrolytic printing solution was used as the printing medium.

In addition to the wear that results from the printing process there is also wear associated with mechanical abrasion between the electrode an the printing medium. In order to characterize mechanical wear, steel spheres 0.62 cm in diameter were plated with ruthenium oxide with an intermediate layer of titanium oxide. The spheres were rigidly held with 100 gm force applied between the sphere and the abrasive surface. The abrasive surface was chosen to simulate the characteristics of the printing medium. Wear tests were done both wet and dry. For comparative purposes steel spheres without the ruthenium oxide coating were tested.

These results are tabulated in TABLE II.

TABLE II

| Material | Test condition | Wear resulting from mechanical abrasive Wear (*) inch/μ (*) |
|---|---|---|
| RuO$_2$ | wet | $5 \times 10^6$ inch/μ |
| RuO$_2$ | dry | $3.5 \times 10^5$ inch/μ |
| Steel | wet | $2.5 \times 10^5$ inch/μ |
| Steel | dry | $8 \times 10^3$ inch/μ |

(*) This unit of wear represents the length of paper that will pass under the head at 100 g force for the sample to wear 1 micron (μ).

As can be seen from examination of the data, the use of ruthenium oxide increases the wear resistance by about an order of magnitude. With a wear rate of $10^4$ microns per one hour, an oxide layer of approximately 50,000 A should be adequate to provide an electrode which would offer trouble free service for approximately 2 years. The thickness of the layer can be increased to increase the life expectancy of the electrode. However, an upper practical limit for the thickness of the ruthenium oxide for a composite electrode as shown in FIG. 1 would be about 250,000 A or 25 microns (1mil). A thickness of above 2 mils could introduce stress factors into the RuO$_2$ film.

A preferred general method for fabricating the improved electrode of this invention consists of building up a composite on a conductive substrate. The first layer is for bonding purposes and is preferably TiO$_2$. The second layer should be an electronic conductor, with reduced mechanical and electrochemical wear and is preferably RuO$_2$.

A composite electrode as shown in FIG. 1 can be fabricated with a metal substrate 16 onto which is formed a layer of titanium oxide 18. The titanium oxide layer may be formed by depositing titanium onto the substrate 16 and thereafter oxidizing the titanium layer, or alternatively reactive ion sputtering the titanium oxide layer directly onto the metal substrate. The preferred method of depositing Ti onto the metal substrate is by evaporation, or sputtering from Ti targets. This is followed by exposure to 0.5 atmospheres of O$_2$ at about 500° C. Alternatively, the metal substrate itself can be titanium. In this case, the intermediate bonding TiO$_2$ layer can be easily formed by heating in 0.5 atmosphere of O$_2$ at 200° C. for 1 hour.

Onto the titanium oxide layer, a ruthenium oxide layer is formed. The ruthenium oxide layer can be formed either by depositing a ruthenium layer thereon and subsequently oxidizing the ruthenium or alternatively by reactive ion sputtering. The deposition of the ruthenium metal layer is accomplished by one of the following methods:

(a) electrolysis from aqueous ruthenium solutions,
(b) by evaporation, or
(c) by sputtering, from Ru metal targets. Once formed, the Ru layer is oxidized to RuO$_2$ by exposure to 0.5 atmospheres of O$_2$ at 500° C. The electrolytic deposition method is preferred because it does not require any masking.

INDUSTRIAL APPLICABILITY

The present invention will be of use in the non-impact printing industry and of particular use to electrolytic printing applications.

Having thus described our invention, what we claim as new, and desire to secure by Letters Patent is:

1. In a process for electrolytic printing on a printing medium, the improvement comprising:
   using an electrode having a region which is an oxide of metal from the group of Ru, Ir, Rh, Pt or an alloy thereof, said oxide region being at an extremity of the electrode which during printing is in close proximity to the printing medium.

2. The process of claim 1 wherein said oxide forms a continuous layer and is $RuO_2$.

3. The process of claim 2 wherein the improvement further comprises an intermediate region beneath said continuous layer of $RuO_2$, said intermediate region being $TiO_2$.

4. The process of claim 1 further comprising an electrode having a substrate which has an electrically conductive surface.

5. The process of claim 4 wherein the substrate is titanium.

6. The process of claim 3 wherein the thickness of said region of $TiO_2$ $L$ *is between about* 200 A and 10,000 A.

7. The process of claim 2 wherein the thickness of said $RuO_2$ layer is between about 5,000 A and 50,000 A.

* * * * *